June 30, 1925. Re. 16,103
J. L. SULLIVAN
WIRE FASTENING DEVICE
Original Filed Dec. 13, 1920
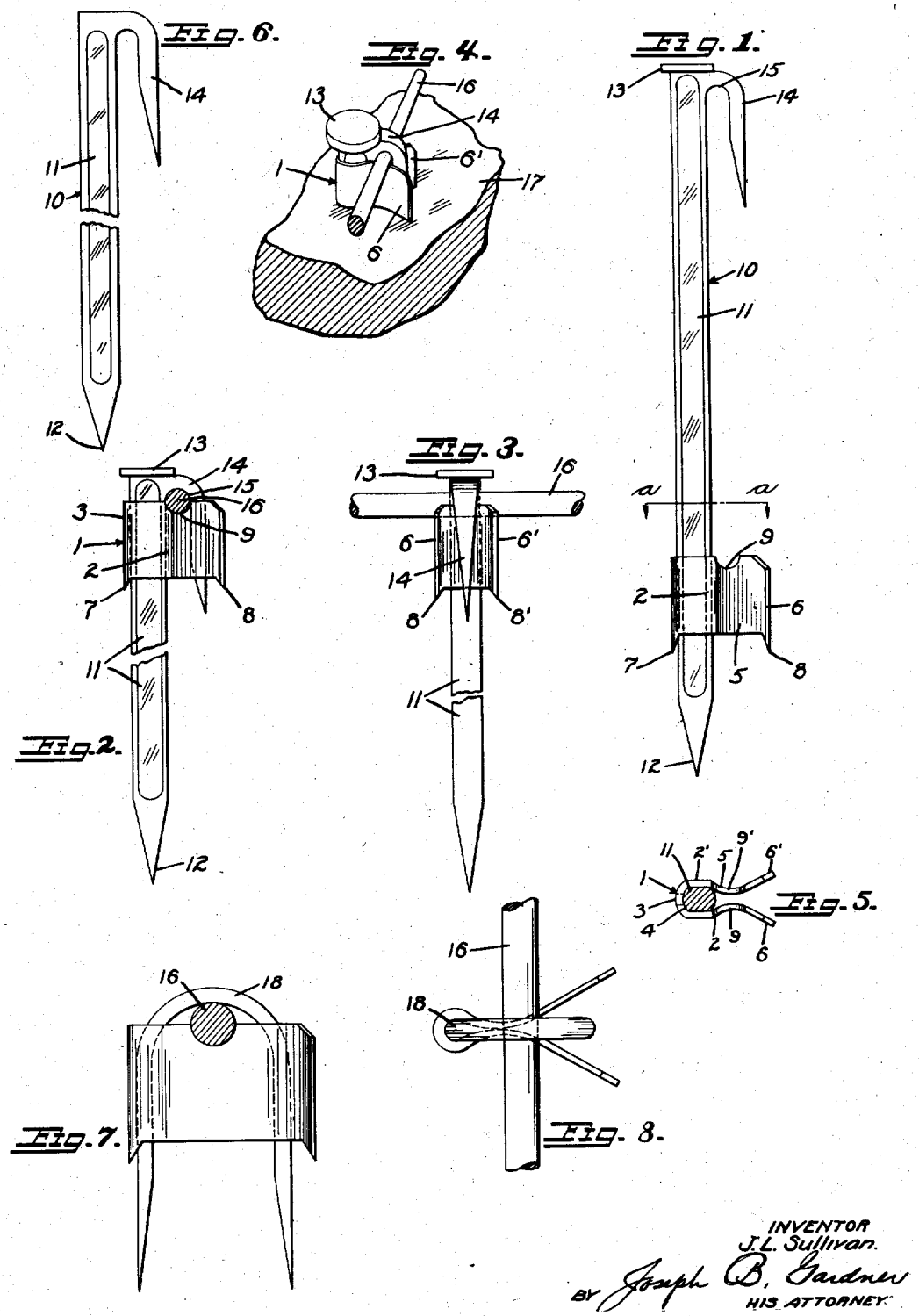
INVENTOR
J. L. Sullivan.
BY Joseph B. Gardner
HIS ATTORNEY.

Reissued June 30, 1925. Re. 16,103

UNITED STATES PATENT OFFICE.

JOHN L. SULLIVAN, OF BERKELEY, CALIFORNIA.

WIRE-FASTENING DEVICE.

Original No. 1,435,429, dated November 14, 1922, Serial No. 430,433, filed December 13, 1920. Application for reissue filed October 1, 1924. Serial No. 741,054.

*To all whom it may concern:*

Be it known that I, JOHN L. SULLIVAN, a citizen of the United States, and a resident of Berkeley, county of Alameda, and State of California, have invented a new and useful Wire-Fastening Device, of which the following is a specification.

My invention relates to wire fastening devices for securing plastering netting, or the like, to the sheathing of a building.

An object of the invention is the provision of a metal spacing member carried by a driven prong, adapted to hold the netting a predetermined distance away from the sheathing over which the netting is to be fastened, thereby permitting key space for the plaster between the netting and the sheathing. Another object of the invention is to provide a unitary, ready-assembled device for securing the netting or other metallic fabric to the wall or sheathing of a building in spaced relation thereto.

A further object is the provision of a pair of diverging arms on the spacing member for providing a footing or base engageable with the surface of the sheathing board into which the driven prong may be operatively hammered, and also for providing means engageable with the tar paper, sometimes applied to the exterior of the sheathing inside the wire netting, for temporarily securing the same before the netting and plaster have been applied.

With the foregoing and other objects and purposes in view, which will appear as the description proceeds, my invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:

Figure 1 is a side elevaton of a wire fastening device constructed in accordance with my invention, showing the spacing member slidably disposed on the lower end of the driven prong.

Figure 2 is a side elevation of the device, showing the spacing member moved into its final position upon the prong, showing also a piece of wire disposed between an upper portion of the spacing member and an arm on the upper end of the driven prong.

Figure 3 is a view of one of the edges of the device showing its members in the same relative position as shown in the last preceding figure.

Figure 4 is a view in perspective of a fragment of a sheathing board and one of my wire fastening devices secured thereto, also showing a portion of the wire netting secured to the device.

Figure 5 is a cross-section on the line *a—a*, Fig. 1.

Figure 6 is an elevation of a modification of the fastener member,

Figure 7 is a view of a fastener made in the form of a staple, shown in conjunction with a spacer.

Figure 8 is a top view of the device shown in Fig. 7.

Referring to the drawings in detail, throughout which like reference characters designate like parts:

The numeral 1 designates a spacer member, which comprises a pair of oppositely disposed vertical flat side pieces 2, 2′, unitarily joined together as at 3, said side pieces, beginning at their point of union, are first spaced at a distance apart, thereby forming therebetween a vertical opening 4, they next converge as at 5, and then diverge so as to form two opposite terminals 6, 6′.

Upon the lower edge of the point of union of the side pieces 2, 2′, is a downwardly projecting pointed spur 7, while upon the lower edges of the terminals 6, 6′, are disposed downwardly projecting pointed spurs 8, 8′.

Into the upper edges of the side pieces, intermediate their ends, are cut arcuated notches 9, 9′.

The inner surfaces of the intermediate sections of the side pieces 2, 2′, may be made so as to contact, as best shown by dotted lines in Fig. 8, or they may be made so as to permit of a slight air space as best shown in Fig. 5.

10 is a fastener comprising a shank 11 provided at its lower end with a point 12, at its upper end with a circular head 13 and on one edge adjacent its upper end with an arm or lateral extension 14, which overlies the notch or indentation 9 in the spacer, so that when the shank is driven into the wall, the extension 14 cooperates with the spacer to confine the wire in the indentation. In the embodiment of the invention shown in Fig. 1, the free end of the arm 14 is pointed and projects downwardly, thereby forming an arcuate crotch 15 which cooperates with the indentation to completely encircle the applied wire 16. The spacer is secured to the shank, preferably in such manner that it is normally held against movement with respect thereto, so that the spacer will not become displaced from the shank as the device is handled and applied.

16 designates a strand of wire having its upper side disposed in the crotch 15 and its lower side disposed in the notches 9, 9′.

17 designates a fragment of a sheathing board of a building.

In the modification shown in Fig. 7 and Fig. 8, I employ a staple 18 in place of the fastener 10, the body or curved portion of the staple constituting the lateral extension of the shank which cooperates with the spacer to secure the applied wire 16 in spaced relation to the wall or sheathing.

The device of my invention is assembled in manufacture, the spacer being attached to the shank so that it is substantially immovable with respect thereto during handling and applying. The spacer is spaced from the head of the shank, as is shown in Fig. 1. In applying the device of my invention to secure the wire netting to the sheathing, the device is usually grasped at the portion of the shank between the head and spacer and passed through the netting to place the spacer between the netting and the sheathing in such position that a strand of the netting may be seated in the indentation. Then with the strand positioned between the indentation 9 and the extension 14, the fastener is driven into the sheathing, first causing the spacer, by reason of its frictional engagement with the shank, to be carried toward the sheathing until it bears thereon, and then forcing the shank through the spacer until the strand is firmly gripped between the extension and indentation.

Having described the invention, I claim:

1. A wire fastening device comprising a spacer member embodying a pair of flat side members disposed side by side in a vertical manner and having registering ends unitarily joined together, the opposite ends of the side members inclined outwardly, a plurality of downwardly projecting spurs on the lower edges of said side members, and a pair of spaced apart shafts vertically movably disposed between said side members, said shafts having the upper ends unitarily joined together, portions of said shafts projecting above and below the side members.

2. A wire fastening device comprising a tubular spacing member having a pair of terminal arms projecting out from one side, said arms provided with notches in the upper edge, a shaft projecting downwardly through said tubular spacing member, said shaft having a downwardly projecting hook at its upper end, said hook operatively movable between said terminal arms, a portion of said hook crossing the horizontal axes of said notches.

3. The combination with a wire, of a tubular spacing member having a pair of terminal arms projecting out from one side, each of said arms provided with a notch in its upper edge, said notches engaging one side of said wire, a shaft projecting down through said tubular spacing member, and said shaft provided at its upper end with a hook operatively projectable between said terminal arms and having a portion engagable with the opposite side of said wire for holding it firmly in said notches.

4. A wire fastening comprising, a spacing member formed into a loop having two outwardly projecting terminal arms having notches cut into the upper edge, the axes of said notches horizontally disposed, a shaft projecting downwardly through said spacing member, and a hook on said shaft adjacent its upper end, said hook operatively crossable over said axes and having its free end movable between said terminal arms.

5. In a wire fastener of the character described, a spacer member bent into a loop, the free ends of the loop formed into a pair of outwardly projecting terminal arms provided adjacent their intersection with said loop with oppositely disposed notches and provided at their lower outer extremities with downwardly projecting spurs.

6. In a wire fastening device of the character described, in combination, a spacer member bent into a loop, the free ends of the loop formed into a pair of outwardly projecting terminal arms provided at their intersection with the loop horizontally opposed arcuated notches in their upper edges and provided at their lower outer extremities with downwardly projecting spurs, and a shaft vertically, movably projecting through the loop, the shaft provided at its upper end with a crooked projection having its free end operatively movable between said terminal arms, a portion of said projection disposed above the axis of said notches.

7. In a wire fastening device of the character described, the combination with a fastening shank, of a spacer member formed into a loop encircling an intermediate portion of said shank, the loop having upon one side a pair of horizontally opposed outwardly extending arms bent to extend first in directions towards each other and thence in directions away from each other, the loop yieldingly clamped upon said shank by the tension of itself.

8. In a wire fastening device of the character described, a spacer member formed like a loop and having a pair of outwardly extending terminal arms, said arms formed to extend first in a direction towards each other and thence inclined away from each other, the upper edges of the arms provided with arcuated notches horizontally opposed and the lower edges of said arms provided with downwardly projecting spurs, a shaft vertically slidably disposed in said loop and means at the upper end of the shaft overhanging the axes of said notches and operatively movable between said arms outwardly from said notches.

9. In a wire fastening device of the character described, a spacer member formed into a loop, an outwardly projecting terminal arm on said loop, the arm having an arcuated notch in its upper edge and a spur on its lower edge, and a shaft vertically slidably disposed in said loop, the shaft having a downwardly projecting arm on its upper end, the free end of the arm vertically movable along one side of the terminal arm intermediate its outer end and said notch.

10. In a wire fastening device af the class described, the combination with a fastening shank of a spacer member formed of sheet metal bent into a loop encircling an intermediate portion of the shank and operatively yieldingly clamped thereupon by the tension of itself, the loop provided on one side with a pair of oppositely disposed outwardly projecting arms bent to first converge and then diverge.

11. In a wire fastening device of the character described, the combination with a fastening shank, of a spacer member formed of sheet metal bent into a loop embracing said shank and normally secured thereto against movement by the tension of itself, the free ends of the loop extending outwardly to form a pair of oppositely disposed arms bent to first converge and then diverge, said arms and loop disposed in the same horizontal plane, the upper edges of said arms adjacent the shank being provided with notches.

12. In a device of the character described, a fastening element embodying a shank member having a wire engaging projection on one side adjacent its upper end, and a spacer element embodying a strip of sheet metal formed into a loop encircling said shank member and having a wire engaging projection on one side, said spacer element slidable on said shank member whereby said projections may be caused to engage each other for securing a wire therebetween.

13. In a device of the character described, a fastening element comprising a shank member having a wire engaging projection at its upper end, and a spacer element comprising a strip of sheet metal formed into a loop slidably encircling said shank member and having a wire engaging projection on one side, said projections disposed in vertical alinement with each other and cooperable for securing a wire therebetween when said spacer element is moved along said shank member a proper distance vertically.

14. A device for securing wire netting to a wall in spaced relation thereto, comprising a spacer adapted to bear against the wall, a prong passing through said spacer, the spacer being normally held against movement relative to the prong by engagement with the prong and a lateral projection on the prong normally spaced from the spacer and adapted to be moved into cooperative relation with the spacer to confine an applied wire when the prong is driven into the wall.

15. A device for securing wire netting to a wall in spaced relation thereto, comprising a prong adapted to be driven into the wall, a spacer engaging said prong adjacent its end and normally held against movement relative thereto, said spacer having an indentation on its upper surface and means on the prong adapted to confine a wire in the indentation when the prong is driven into the wall while the spacer is in contact with said wall.

16. A device for securing metallic fabric to a wall in spaced relation thereto, comprising a prong adapted to be driven into the wall, a spacer through which the prong extends disposed adjacent one end of the prong, said spacer being in substantial immovable engagement with the prong so that it will not become disengaged therefrom, a lateral extension on the other end of the prong overlying the spacer, impact on said other end of the prong serving to drive the prong into the wall and move said lateral extension into engagement with the spacer to confine an applied wire between the extension and the spacer and to hold the wire spaced from the surface of the wall, the spacer being held in contact with the wall during the prong driving operation by virtue of the tight engagement of the prong and spacer.

17. A device for securing reinforcing netting to a wall in spaced relation thereto, comprising a spacer adapted to bear against the wall, a prong passing through said spacer, the spacer being normally carried by the prong to resist removal therefrom, and means on the prong normally held separated from the spacer for insertion of a portion of the netting therebetween and adapted to be moved into cooperative relation with the spacer to grip said netting when the prong is driven into the wall.

18. A multi-piece device arranged to be handled as a unit and adapted for securing reinforcing netting to a wall in spaced relation thereto, comprising a prong adapted to be driven into the wall, a spacer through which the prong extends carried by the prong and normally held thereon to resist detachment therefrom, and means formed integral with the prong arranged to be spaced from the spacer for the positioning of a portion of the netting therebetween and adapted to be moved into cooperative relation with the spacer to engage said netting and hold the same against said spacer.

JOHN L. SULLIVAN.